Patented June 21, 1949

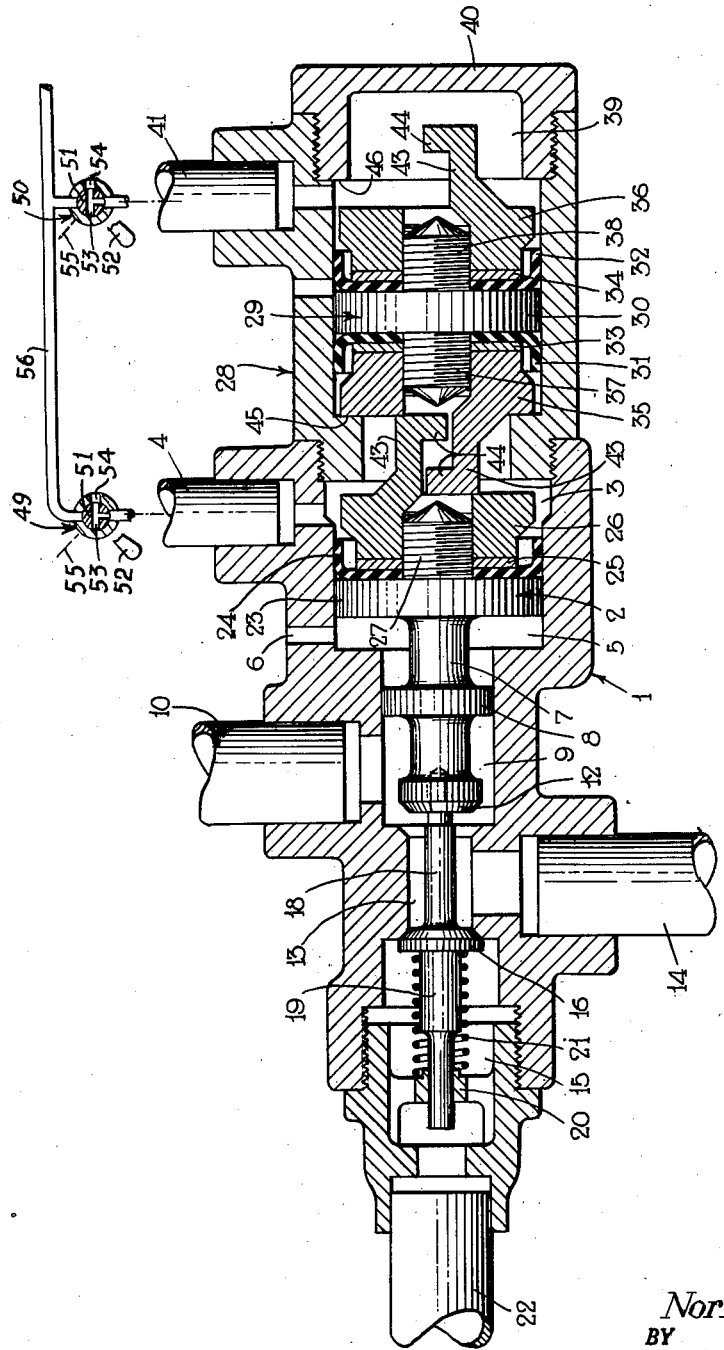

2,473,687

UNITED STATES PATENT OFFICE 2,473,687

FLUID PRESSURE RELAY VALVE MECHANISM

Norman G. Kershaw, London, England, assignor, by mesne assignments, to The Westinghouse Air Brake Company, Wilmerding, Pa., a corporation of Pennsylvania Application June 25, 1946, Serial No. 679,097
In Great Britain October 9, 1945

2 Claims. (Cl. 121—38)

1

This invention relates to a control mechanism and more particularly to a fluid pressure relay valve mechanism for controlling supply and release of fluid under pressure to and from a fluid pressure apparatus to be operated.

The principal object of the invention is the provision of an improved mechanism of the above type so constructed as to require operation of all of a plurality of control devices, or establishment of all of a plurality of different control pressures, in order to operate to effect a desired result, such as to supply fluid under pressure to an apparatus to be operated.

In the accompanying drawing the single figure is a longitudinal sectional view of a valve mechanism embodying the invention.

Description

As shown in the drawing, the improved valve mechanism comprises a casing section 1 containing a piston 2 having at one side a pressure chamber 3 open to a control pipe 4 and having at the opposite side a non-pressure chamber 5 open to atmosphere through a port 6. The piston 2 has a stem 7 projecting through chamber 5 and provided intermediate its ends with a baffle piston 8 slidably mounted in a bore in the casing and separating the non-pressure chamber 5 from a chamber 9 which may be open to atmosphere through a pipe 10. On the end of stem 7 in chamber 9 there is provided a fluid pressure release valve 12 for controlling communication between chamber 9 and a chamber 13 to which is connected a pipe 14 for conveying fluid under pressure to and from a device or apparatus (not shown) which it is desired to control by fluid under pressure. The casing also has a chamber 15 containing a fluid pressure supply valve 16 for controlling communication between said chamber and chamber 13. The supply valve 16 has a stem 18 connected to the release valve 12, and an oppositely extending stem 19 slidably mounted in a guide 20 in the casing. A coil spring 21 encircling stem 19 is interposed under pressure between the guide 20 and the supply valve 16. Chamber 15 is connected to a fluid pressure supply pipe 22 adapted to be supplied with fluid under pressure from any suitable source.

Normally, the spring 21 is adapted to hold the supply valve 16 closed and the release valve 12 open to permit release of fluid under pressure from pipe 14 by way of pipe 10, but movement of piston 2 in the direction of the left hand is adapted to seat valve 12 and open valve 16 to permit flow of fluid under pressure from the supply pipe 22 to pipe 14 for operating the device or apparatus connected to the latter pipe.

The piston 2 comprises a piston head 23 and a packing cup 24 clamped against said head by means of a follower plate 25 engaging said cup and a nut 26 engaging said plate and having screw-threaded engagement with a stud 27 projecting from said head. Removably secured to casing 1 over the end of pressure chamber 3 opposite the piston 2 is a casing section 28 having a bore arranged in coaxial relation to piston 2 and containing a piston 29 of substantially the same area as piston 2. The piston 29 comprises a head 30, and two oppositely arranged packing cups 31 and 32 clamped against opposite faces of said head by, respectively, follower plates 33 and 34 and clamping nuts 35 and 36 having screw-threaded engagement with studs 37 and 38 projecting from said head. The packing cup 31 is so arranged as to cooperate with packing cup 24 to hold fluid under pressure in chamber 3, while packing cup 32 is arranged to hold fluid under pressure in a pressure chamber 39 provided between piston 29 and a cap 40 which is removably secured to the end of casing section 28 opposite that connected to casing 1. Pressure chamber 39 is connected to an additional control pipe 41; pipe 4 constituting what may be called a first control pipe. The space between the two packing cups 31 and 32 may be open to atmosphere through a port 42 in the casing section 28.

The two control pipes 4 and 41 may be connected to two operator's control valve devices 49 and 50 which are provided for controlling supply and release of fluid under pressure to and from the piston chambers 3 and 39. Each of the control valve devices 49 and 50 may, for illustration, comprise a rotary plug valve 51 and a handle 52 arranged to turn said valve to either of two positions, namely, the position in which it is shown in the drawing for opening the respective pipe 4 or 41 to atmosphere by way of a port 53 in the valve and a passage 54, and a second position, such as indicated by a dotted line 55 for said handle, in which port 53 will open said pipe to a source of fluid under pressure such as may be present in a fluid pressure supply pipe 56.

Each of the clamping nuts 26, 35 and 36 is provided with an extension 43 which is undercut to provide a hook or finger 44, the hooks 44 on the nuts 26 and 35, which are disposed in pressure chamber 3, constituting a lost motion interlock for preventing the two pistons 2 and 29 moving apart more than a fixed amount. A stop 45 in casing section 28 is provided for contact by piston 29 to limit movement thereof toward the left hand, while a stop 46 on the inner end of cap 40 may be provided for contact by said piston to limit movement thereof toward the right hand.

*Operation*

In operation, let it be initially assumed that both control pipes 4 and 41 and thereby the respective pressure chambers 3 and 39 are open to asmosphere under which condition spring 21 will seat the supply valve 16, open the release valve 12 and cause piston 2 to assume the position in which it is shown in the drawing. With the release valve 12 open fluid under pressure will be released from pipe 14 to atmosphere by way of pipe 10.

Now let it be assumed that it is desired to supply fluid under pressure to pipe 14 for effecting a desired operation. To accomplish this, fluid under pressure may first be supplied through control pipe 4 to pressure chamber 3 wherein it will act on piston 2 in one direction and on piston 29 in the opposite direction. Movement of piston 2 by fluid under pressure in chamber 3 being opposed by spring 21 and pressure of supply fluid in chamber 15 acting on the supply valve, and movement of piston 29 being unopposed except by friction, the pressure of fluid in chamber 3 acting on the latter piston will move same relative to and in a direction away from piston 2 to a position in contact with stop 46, if it does not already occupy said position. In this position of piston 29, the interlocking fingers 44 on the nuts 26 and 35 in chamber 3 will contact each other, and since the pistons 2 and 29 are of the same areas, the effect of pressure of fluid on piston 2 will be neutralized by its effect on piston 29 and piston 2 will therefore remain in the position in which it is shown in the drawing.

If now fluid is supplied through the control pipe 41 to pressure chamber 39 at substantially the same pressure as acting in chamber 3, its effect on piston 29 will balance the pressure in chamber 3 acting on said piston and thereby render said piston ineffective to oppose movement of piston 2, whereupon pressure of fluid in chamber 3 acting on piston 2 will actuate piston 2 to first close the release valve 12 and then open the supply valve 16 for supplying fluid under pressure to pipe 14.

Now let it be assumed that in order to supply fluid under pressure to pipe 14, fluid under pressure is first supplied through control pipe 41 to pressure chamber 39. The piston 29 will thereby be moved toward the left hand until it engages stop 45. This movement of piston 29 will be relative to piston 2 as permitted by the interlocking fingers 44 in chamber 3 which will be moved apart, and piston 2 will therefore remain in the position in which it is shown in the drawing due to pressure of spring 21 and of fluid in chamber 15 acting on the supply valve 16. If fluid under pressure is now supplied to chamber 3 through pipe 4, the piston 29 will remain in the position in which it is shown in the drawing due to pressure of fluid in chamber 39, and with the fingers 44 in chamber 3 moved apart the pressure of fluid in chamber 3 acting on piston 2 will be enabled to actuate piston 2 to close the release valve 12 and open the supply valve 16.

In order to release fluid under pressure from pipe 14, fluid under pressure may be released from either or both of the control pipes 4 and 41. If for instance fluid under pressure is released only from pipe 4, the interlocking fingers 44 in chamber 3 will permit movement of piston 2 relative to piston 29 by spring 21 for closing the supply valve 16 and for opening the release valve 12. If however, the fluid under pressure is released only from pipe 41, the effect of pressure of fluid in chamber 39 on piston 29 is removed, while the effect of pressure of fluid in chamber 3 on said piston balances its effect on piston 29 which thereby renders spring 21 and pressure of fluid in chamber 15 acting on the supply valve 16 effective to close said valve and open the release valve 12.

It will now be seen that in order to effect a supply of fluid under pressure to pipe 14, it is necessary to supply fluid under pressure to both of the control pipes 4 and 41, and it is immaterial which one of said pipes is first supplied. If pipe 4 is first supplied with fluid under pressure the action of piston 29 through the interlocking fingers 44 in chamber 3 will prevent movement of piston 2, while in case pipe 41 is first supplied with fluid under pressure, movement of piston 29 is arrested by stop 45 in a position short of operating piston 2, but such movement positions the respective interlock finger 44 in chamber 43 to permit subsequent movement of piston 2 upon supply of fluid under pressure to chamber 3.

In the casing section 28 the extension 43 of the nut 36 could be dispensed with, if such were desired.

Having now described my invention, what I claim as new and desire to secure by Letters Patent, is:

1. A control mechanism comprising a casing, first and second movable abutments disposed in said casing in coaxial relation to each other, adjacent faces of said abutments cooperating with said casing to form a first pressure chamber, the opposite face of said second abutment cooperating with said casing to form a second pressure chamber, means for conveying fluid under pressure to and from said chambers individually, said first abutment having a normal position and adapted to be moved out of said normal position to a second position by fluid under pressure in said one chamber, an element associated with said first movable abutment having an interlock finger disposed in said one chamber, another element associated with said second movable abutment having an interlock finger disposed in said one chamber in the path of movement of the first mentioned interlock finger and adapted to engage said first mentioned interlock finger upon movement of said second abutment by fluid under pressure in said first chamber to hold said first abutment against movement, said second abutment being movable upon supply of fluid under pressure to said second chamber to move the respective interlock finger out of contact with the other finger to render said first movable abutment movable by fluid under pressure in said first chamber.

2. A control mechanism comprising a first casing section having an open ended chamber, a movable abutment disposed in said chamber having a normal position adjacent the open end of said chamber and adapted to be moved into said casing section to another position, a second casing section having one end removably secured to said first casing section over the open end of said chamber and having an opening open at one end to said chamber and open at the opposite end to a second chamber arranged in coaxial relation to said first chamber and opening through the opposite end of said second casing section, a cover removably secured to said opposite end of said second casing section closing the end of said second chamber, a movable abutment disposed in said second chamber cooperating with said first movable abutment to form a first pressure chamber between the adjacent faces of the two movable abutments and cooperative with said cover to form a second pressure chamber at the opposite face of said second movable abutment, a pipe connected to said first casing section and open to said first pressure chamber for conveying fluid under pressure to and from said first pressure chamber, another pipe connected to said second casing section and open to said second pressure chamber for conveying fluid under pressure to and from said second pressure chamber, said second movable abutment having a movement in said second casing section equal at least to the distance between said normal and other positions of said first abutment, stop means in said second casing section arranged to limit movement of said second abutment in the direction of said first abutment, and an interlock element projecting from each abutment into said first pressure chamber, the interlock elements cooperating upon movement of said second abutment away from said stop means by fluid under pressure in said first pressure chamber to hold said first abutment against movement from its normal position, said second abutment when in contact with said stop means rendering said interlock elements ineffective to prevent movement of said first abutment from its normal position to its other position.

NORMAN G. KERSHAW.

REFERENCES CITED

The following references are of record in the file of this patent:

UNITED STATES PATENTS

| Number | Name | Date |
|---|---|---|
| 787,480 | Tanner | Apr. 18, 1905 |
| 1,684,033 | Josephs | Sept. 11, 1928 |